United States Patent
Saitou et al.

(10) Patent No.: US 7,528,708 B2
(45) Date of Patent: May 5, 2009

(54) VARIATION DETECTION DEVICE, DATA COMMUNICATION APPARATUS, AND METHOD OF DETECTING VARIATION

(75) Inventors: Akira Saitou, Yamagata (JP); Yoichi Takahashi, Yamagata (JP); Tomotake Ooba, Yamagata (JP); Keiichi Iwazumi, Yamagata (JP); Fujio Higuchi, Yamagata (JP); Keiko Kobayashi, Yamagata (JP)

(73) Assignee: NEC Electronics Corporation, Kawasaki (JP)

( * ) Notice: Subject to any disclaimer, the term of this patent is extended or adjusted under 35 U.S.C. 154(b) by 194 days.

(21) Appl. No.: 11/257,651

(22) Filed: Oct. 13, 2005

(65) Prior Publication Data
US 2006/0077048 A1 Apr. 13, 2006

(30) Foreign Application Priority Data
Oct. 13, 2004 (JP) .............................. 2004-299002

(51) Int. Cl.
*B60Q 1/00* (2006.01)
(52) U.S. Cl. ................. 340/449; 307/10.1; 340/426.33; 340/438
(58) Field of Classification Search ................. 340/438, 340/449; 307/10.1
See application file for complete search history.

(56) References Cited

U.S. PATENT DOCUMENTS

| 5,203,983 A | * | 4/1993 | Ohyama et al. | ............. 204/427 |
| 2005/0072217 A1 | * | 4/2005 | Discenzo | ................... 73/53.05 |

FOREIGN PATENT DOCUMENTS

| JP | 61-112938 | 5/1986 |
| JP | 3-501715 | 4/1991 |
| JP | 6-58834 | 3/1994 |
| JP | 2003-14572 | 1/2003 |
| JP | 2003-511287 | 3/2003 |

* cited by examiner

*Primary Examiner*—Brent Swarthout
(74) *Attorney, Agent, or Firm*—McGinn IP Law Group, PLLC

(57) ABSTRACT

A variation detection device has a processor, an AD converter converting a signal voltage output from a sensor to generate an AD converted value and outputting the AD converted value to the processor, a temperature sensor detecting a temperature of the sensor, and a memory storing a table which indicates a relationship between temperatures and initial values. When receiving the AD converted value, the processor identifies a temperature of the sensor based on an output of the temperature sensor, reads out an initial value corresponding to the identified temperature from the table, and calculates a variation between the initial value and the AD converted value.

20 Claims, 7 Drawing Sheets

| TEMPERATURE RANGE (°C) | INITIAL VALUE (LSB) | LATEST OBSERVED VALUE (LSB) | VARIATION VALUE (INITIAL VALUE - OBSERVED VALUE) | ALERT VALUE (LSB) |
|---|---|---|---|---|
| ⋮ | ⋮ | ⋮ | ⋮ | ⋮ |
| -10~-5 | * | * | * | 064H |
| -5~-0 | * | * | * | 064H |
| 0~5 | * | * | * | 064H |
| 5~10 | * | * | * | 064H |
| 10~15 | 215H | 215H | 0 | 064H |
| 15~20 | 220H | 220H | 0 | 064H |
| 20~25 | 225H | 225H | 0 | 064H |
| 25~30 | 228H | * | * | 064H |
| ⋮ | ⋮ | ⋮ | ⋮ | ⋮ |

(0.5LSB/Kpa)

VARIATION DETECTION DEVICE, DATA COMMUNICATION APPARATUS, AND METHOD OF DETECTING VARIATION

BACKGROUND OF THE INVENTION

1. Field of the Invention

The present invention relates to a variation detection device and a method of detecting variation. More specifically, the present invention relates to a variation detection device and a variation detecting method for detecting variation of an output signal from a status detecting apparatus such as a pressure sensor and the like.

2. Description of the Related Art

In recent years, regulations with regard to safety have been intensified one after the other in Japan and United States. According to the TREAD Act (Transportation Recall Enhancement, Accountability and Document Act) which takes effect in North America, a new car that will be sold on 2006 or later is obligated to carry a vehicle tire pressure monitoring system. Therefore, it is currently considered to provide sensors in tires in order to measure tire pressure and temperature. More specifically, sensor units are mounted on valve sections of respective tires such that all four wheels can be monitored individually. Such a system has the advantages that the monitoring in high precision can be attained and the tire pressure can be monitored even during parking and stopping.

When measuring the tire pressure (air pressure of a tire of a vehicle), a sensor unit which is mounted on a valve section of the tire is typically used. Generally, a tire temperature (temperature of a tire of a vehicle) is different between a case when the vehicle is running and a case when the vehicle is stopping. The temperature of the tire of a running vehicle becomes higher than the temperature at the time of stopping due to friction between the tire and a road surface. When the tire temperature increases, temperature of the sensor unit which is mounted on the valve section of the tire also increases.

With regard to a pressure sensor for measuring the tire pressure, an output of the pressure sensor may possibly change depending on the temperature, even if the tire pressure applied to the pressure sensor is constant. Therefore, in order to accurately measure a variation of the tire pressure in a certain interval from a first time to a second time, the tire temperature (namely, the temperature of the pressure sensor) is required to be constant during the interval or to be the same at least between the first time and the second time. However, the temperature is hardly the same between the first time and the second time, when the variation of the tire pressure is measured under natural circumstances. For this reason, an error caused by the temperature difference has been conventionally corrected through a calculation (refer to National publication of the translated version of PCT application JP-2003-511287, for example).

FIG. 1 is a graph showing a temperature characteristic of the pressure sensor. The graph in FIG. 1 represents change in sensor output as a function of the temperature under a condition that the pressure is constant. For example, the constant pressure applied to the pressure sensor is 450 kPa in FIG. 1. As shown in FIG. 1, the output of the pressure sensor changes in response to the change in the temperature. More specifically, the sensor output decreases as the temperature increases. When the correction for the sensor output is carried out through a calculation, it may be required to define a function beforehand which represents a relationship between the sensor output and the temperature shown in FIG. 1. However, the function changes when the applied pressure is changed. Thus, it is difficult to prepare such functions associated with all the pressures in advance. Hence, the collinear approximation is usually applied when the correction is carried out. However, the collinear approximation causes an error to occur in the correction.

When the temperature of the circumstance under which the tire is used changes largely, the air pressure inside the tire is also changed largely. Fro example, when the tire temperature is increased, the air inside the tire expands and thereby the air pressure inside the tire is also increased. It is also required to recognize precursor of tire blowout by detecting a slight change in the tire pressure. Therefore, in order to calculate the variation of the tire pressure accurately in a tire pressure detecting system, it is necessary to consider the fact that the tire pressure is changed in accordance with the temperature variation.

It is required to use a pressure sensor of high precision in order to reduce the error of the sensor output caused by the temperature variation. However, such a high-precision pressure sensor is expensive. As mentioned above, a new car that will be sold on 2006 or later is obligated to carry a vehicle tire pressure monitoring system. When the TPMS employs an expensive circuit, the cost is increased correspondingly. Also, even in the case of the pressure sensor of high precision, the correction is not possible when the tire pressure is changed in accordance with the temperature variation.

A technique is desired which can accurately measure the variation of the tire pressure in a certain interval independent of the tire temperature at the time of the measurement. It is desired to obtain an accurate output without increasing cost.

SUMMARY OF THE INVENTION

In a first aspect of the present invention, a variation detection device has a processor, an AD converter converting a signal voltage output from a sensor to generate an AD converted value (digital data) and outputting the AD converted value to the processor, a temperature sensor detecting a temperature of the sensor, and a memory storing a table which indicates a relationship between temperatures and initial values. When receiving the AD converted value, the processor identifies a temperature of the sensor based on an output of the temperature sensor, reads out an initial value corresponding to the identified temperature from the table, and calculates a variation between the initial value and the AD converted value.

In a second aspect of the present invention, a data communication apparatus has a processor, a pressure sensor, an AD converter converting a signal voltage output from the pressure sensor to generate an AD converted value and outputting the AD converted value to the processor, a temperature sensor detecting a temperature of the pressure sensor, a memory storing a table which indicates a relationship between temperatures and initial pressure values, a receiving circuit supplying a received command signal to the processor, and a transmission circuit. When receiving the AD converted value, the processor identifies a temperature of the pressure sensor based on an output of the temperature sensor, reads out an initial pressure value corresponding to the identified temperature from the table stored in the memory, calculates a variation between the initial pressure value and the AD converted value, and outputs a variation data indicative of the calculated variation through the transmission circuit.

In a third aspect of the present invention, a vehicle is equipped with a data transmission apparatus and a data receiving apparatus. The data transmission apparatus is installed in a tire of the vehicle, and the data receiving apparatus is installed in a body of the vehicle. The data transmission apparatus has the above-mentioned data communication apparatus, and the above-mentioned pressure sensor is configured to detect a tire pressure of the vehicle. The data receiving apparatus receives the variation data transmitted from the data transmission apparatus.

In a fourth aspect of the present invention, a method of detecting a variation of tire pressure is provided. The method includes the steps of: (A) providing a memory which stores a table which indicates a relationship between temperatures and initial tire pressure values; (B) providing a pressure sensor configured to detect the tire pressure; (C) AD converting a signal voltage output from the pressure sensor to generate an AD converted value; (D) identifying a temperature of the pressure sensor in response to the AD converted value; (E) obtaining an initial tire pressure value corresponding to the identified temperature from the table stored in the memory; and (F) calculating a variation between the initial tire pressure value and the AD converted value.

By using a sensor, a variation between an initial state of a target and a state after a predetermined time from the initial state is measured. According to the present invention, it is possible to detect the variation accurately, even if characteristics of the sensor depend on temperature and the sensor output varies in accordance with the temperature variation. Even when the pressure is changed in accordance with the temperature variation, it is possible to detect the pressure variation precisely. Since an expensive sensor of high-precision is not necessary, it is possible to reduce the cost of a system to which the present invention is applied.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

In an embodiment described below, a semiconductor integrated circuit 1 according to the present invention is applied to a TPMS (Tire Pressure Monitoring System) of a vehicle. The TPMS is equipped with a data communication apparatus (tire-side module), and the data communication apparatus has the semiconductor integrated circuit 1. The semiconductor integrated circuit 1 is a variation detection device used for detecting a variation of tire pressure.

Figure 2:
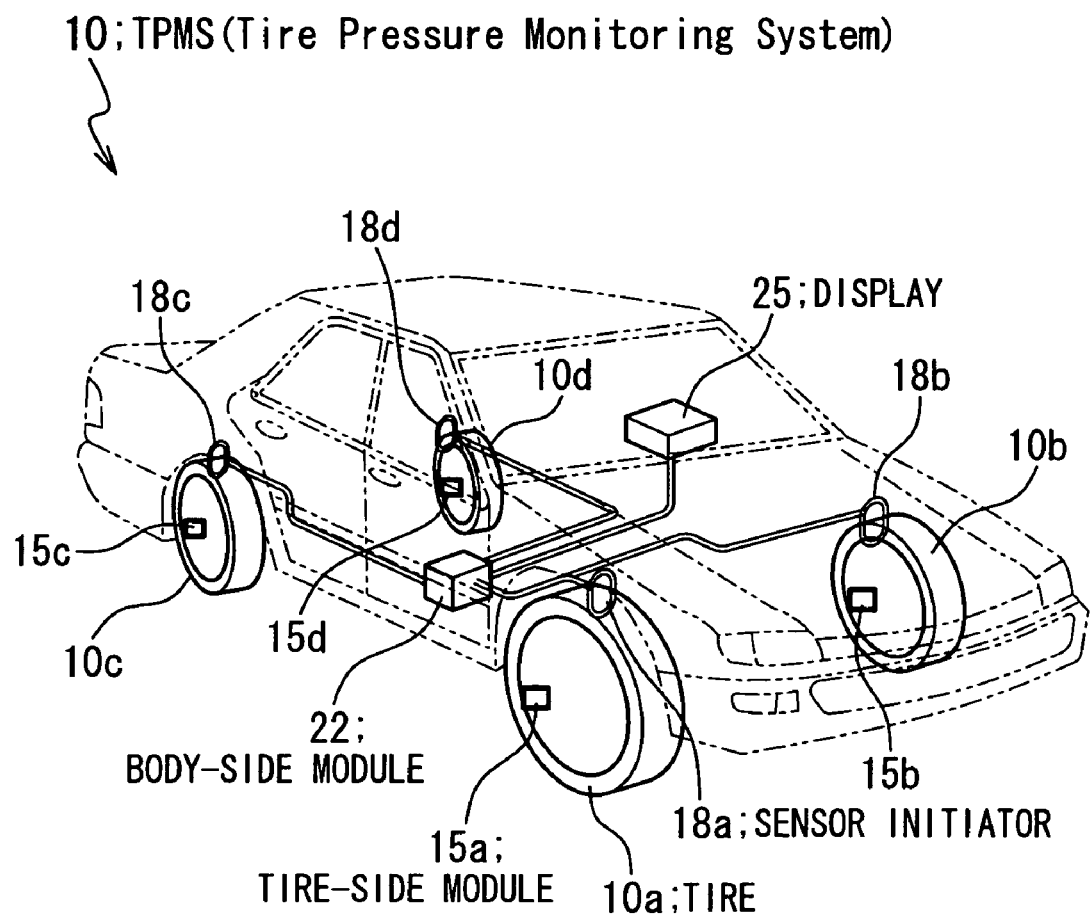
FIG. 2 is a schematic diagram showing a configuration of a TPMS (Tire Pressure Monitoring System) according to an embodiment of the present invention.

FIG. 2 shows a schematic configuration of the TPMS according to the embodiment of the present invention. The schematic configuration of the TPMS of the vehicle will be first explained with reference to FIG. 2.

The TPMS 10 includes tire-side modules 15a to 15d, sensor initiators 18a to 18d, a body-side module 22 and a display 25. The tire-side modules (data transmission apparatus) 15a to 15d are installed in tires 10a to 10d, respectively. The sensor initiators 18a to 18d, the body-side module (data receiving apparatus) 22 and the display 25 are installed in a body of the car. Each of the tire-side modules 15a to 15d includes several kinds of sensors, a transmission unit and a receiving unit. The sensors are used for detecting tire pressure, temperature and so on. The transmission unit transmits data signals indicative of measurement information obtained by the sensors to the body-side module 22 through RF (Radio Frequency) radio waves. The receiving unit receives command signals transmitted from the sensor initiators 18a to 18d through LF (Low Frequency) radio waves. The body-side module 22 receives the data signals transmitted from the tire-side modules 15a to 15d. In addition, the body-side module 22 has a function capable of directly receiving RF radio waves which are transmitted based on a "Key Less Entry" system.

Figure 3:
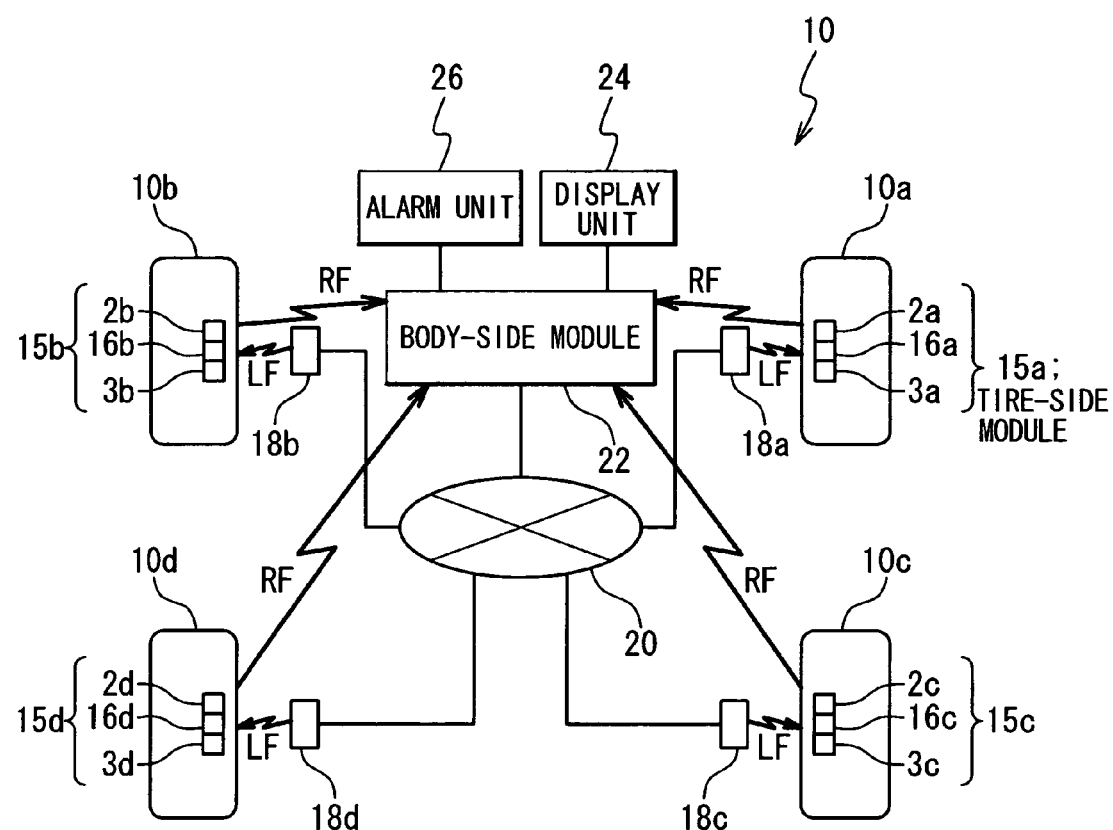
FIG. 3 is a block diagram showing the configuration of the TPMS (Tire Pressure Monitoring System) according to the embodiment of the present invention.
Figure 4:
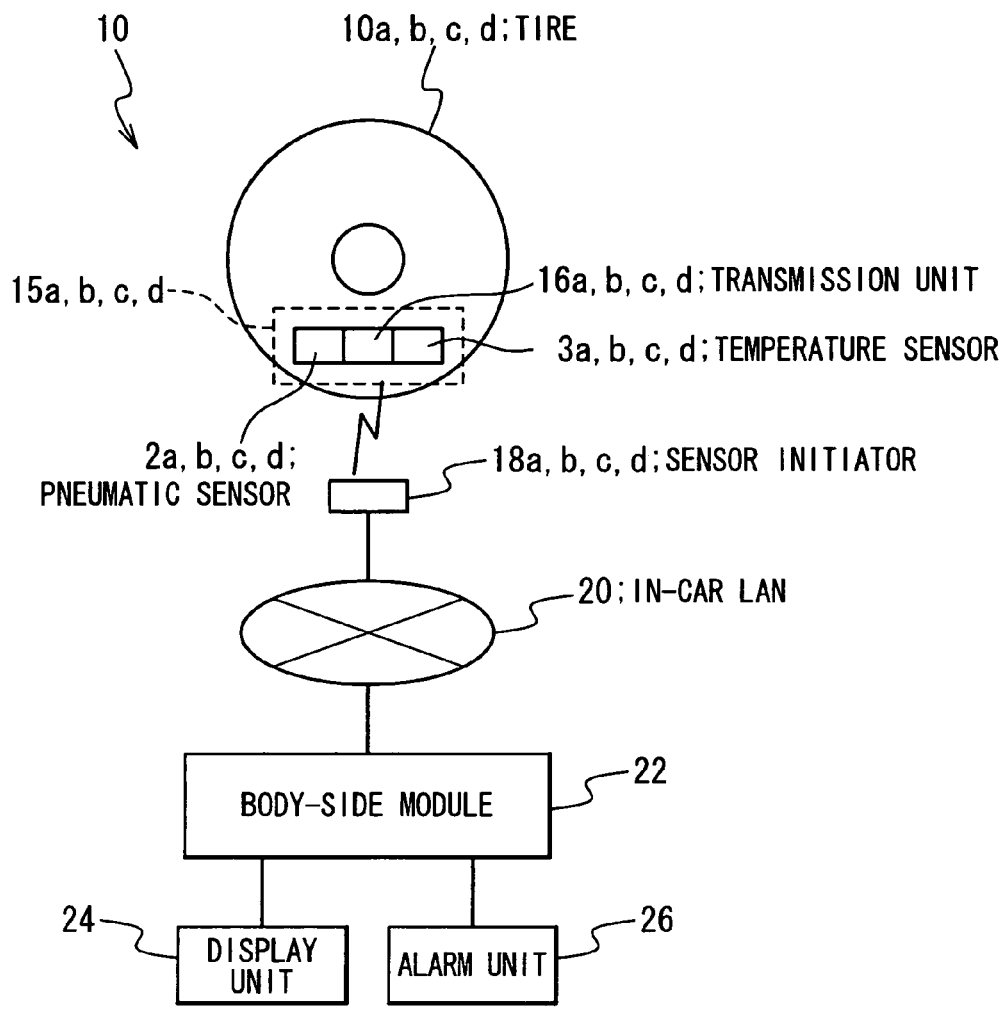
FIG. 4 is a block diagram showing the TPMS (Tire Pressure Monitoring System) according to the embodiment of the present invention.
Figure 5:
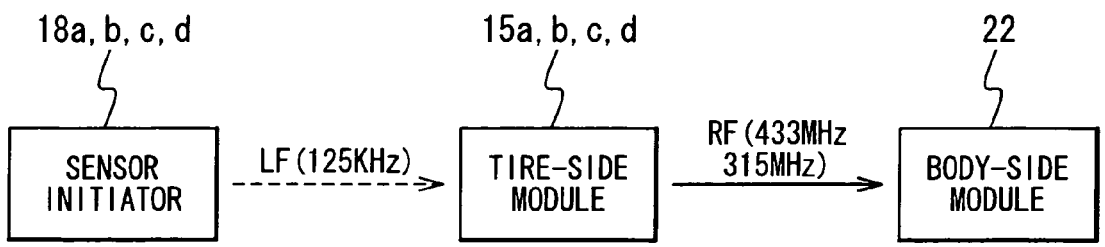
FIG. 5 is a block diagram showing wireless communication paths in the TPMS (Tire Pressure Monitoring System) according to the embodiment of the present invent

FIGS. 3 and 4 are block diagrams showing the configuration of the TPMS 10 according to the present embodiment. FIG. 5 shows wireless communication paths in the TPMS 10 according to the present embodiment.

With reference to FIGS. 3 to 5, the tire-side modules 15a to 15d of the TPMS 10 according to the present embodiment are basically installed in respective of the all tires 10a to 10d. The tire-side modules 15a to 15d include pneumatic sensors 2a to 2d, temperature sensors 3a to 3d, and transmission units 16a to 16d, respectively. Each of the transmission units 16a to 16d transmits the measurement data obtained by the above-mentioned sensors to the body-side module 22 through the RF radio waves.

When a driver gets into a car, the driver transmits the Key Less Entry RF radio waves to the body-side module 22. When the body-side module 22 receives the Key Less Entry RF radio waves, the body-side module 22 transmits command signals through an in-car LAN 20 to the sensor initiators 18a to 18d, respectively. By using LF radio waves, the sensor initiators 18a to 18d activate respective of tire-side modules 15a to 15d in response to the command signals. Immediately after the tire-side modules 15a to 15d are activated by the command signals, the tire pressures and temperatures are measured by the various sensors of the tire-side modules 15a to 15d. The measured data (data signals) are transmitted on the RF (433 MHz, 315 MHz) radio waves from the transmission units 16a to 16d to the body-side module 22 mounted on the body side. On the basis of the received data signals, the body-side module 22 notifies the driver the tire pressures and temperatures by using a display unit 24 such as the display 25 and an alarm unit 26.

When the car starts running, the running of the car is detected by a motion sensor (not shown) mounted in the tire. The data signals indicative of the tire pressures and temperatures obtained by the pneumatic sensors 2a to 2d and the temperature sensors 3a to 3d are transmitted on the RF radio waves from the transmission units 16a to 16d of the tire-side modules 15a to 15d to the body-side module 22, respectively. Here, the data signals may be transmitted at a specific time interval or every time the change in the tire pressure or the tire temperature goes over a specified value. The data signals input to the body-side module 22 are processed through a predetermined computation and are transmitted to the display 24 and the alarm unit 26 through the in-car LAN 20. Accordingly, information regarding the tire pressures and temperatures are notified to the driver.

Figure 1:
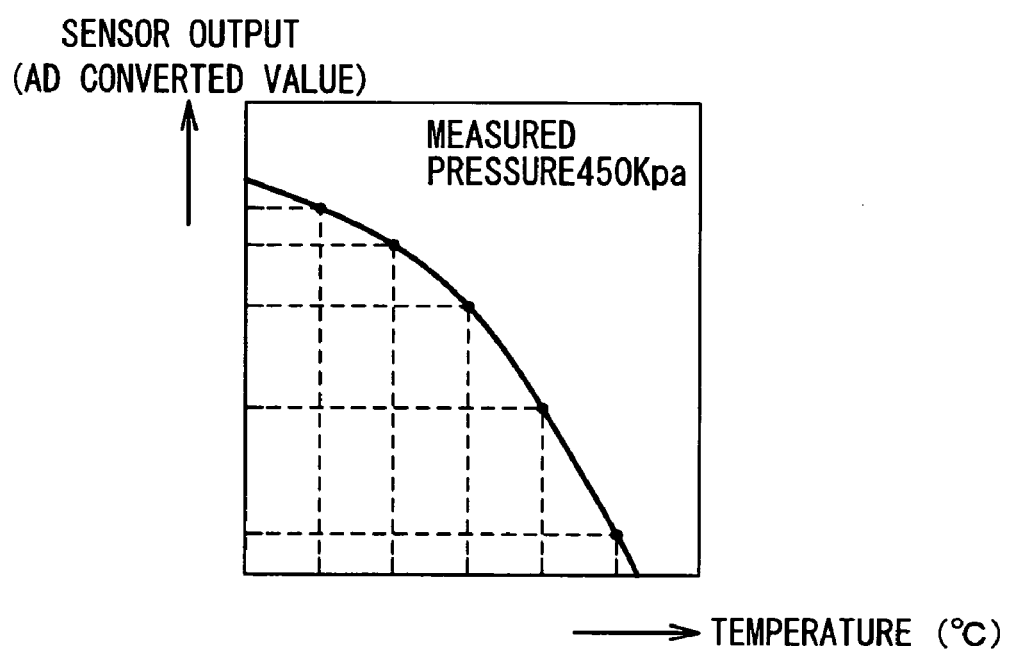
FIG. 1 is a graph showing a temperature characteristic of a pressure sensor.
Figure 6:
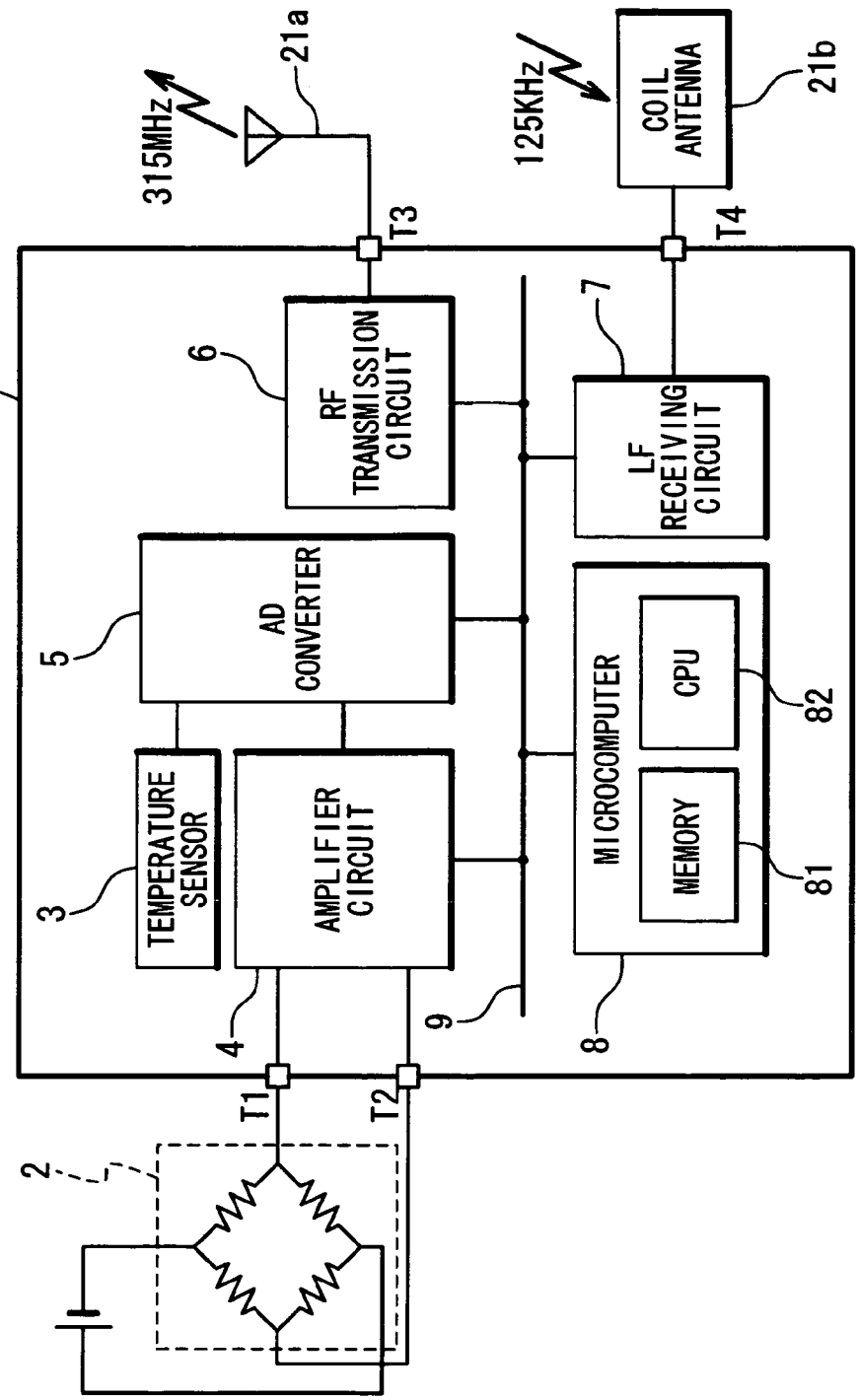
FIG. 6 is a block diagram showing a configuration of a tire-side module according to the embodiment of the present invention.

FIG. 6 is a block diagram showing a configuration of the tire-side module 15 according to the embodiment of the present invention. The tire-side module 15 has the semiconductor device 1, the pneumatic sensor (tire pressure sensor) 2, an RF antenna 21a and a coil antenna 21b. The pneumatic sensor 2 shown in FIG. 6 is a tire pressure sensor for measuring the tire pressure (air pressure of a tire of a vehicle). The tire pressure sensor 2 is installed inside the tire, and outputs a signal voltage corresponding to the tire pressure as a sensor output. In the explanation of the present embodiment below, let us assume that the tire pressure sensor 2 has a characteristic similar to that shown in FIG. 1. The semiconductor device 1 is a variation detection device for detecting a variation of the tire pressure measured by the tire pressure sensor 2.

As shown in FIG. 6, the semiconductor device 1 has a terminal T1 and a terminal T2 which receive the signal voltage output from the tire pressure sensor 2. The semiconductor device 1 amplifies the signal voltage received through the terminals T1 and T2 to generate an amplified voltage. The semiconductor device 1 performs an AD conversion on the amplified voltage to generate an AD converted value (digital signal). Further, the semiconductor device 1 generates a tire pressure data on the basis of the AD converted value. The semiconductor device 1 outputs the tire pressure data to the body-side module 22 through a terminal T3 and the RF antenna 21a. Also, a signal received by the coil antenna 21b is supplied through a terminal T4 to the semiconductor device 1.

The RF antenna 21a is an antenna for transmitting RF radio waves of data signals. The data signals produced by the semiconductor device 1 are transmitted from the RF antenna 21a to the body-side module 22 installed in the car body. The coil antenna 21b is a coil antenna for receiving LF radio waves of command signals transmitted from the body-side module 22. The command signals received by the coil antenna 21b are supplied to the semiconductor device 1 through the terminal T4.

As shown in FIG. 6, the semiconductor device 1 includes a temperature sensor 3, an amplifier circuit 4, an AD converter 5, an RF transmission circuit 6, an LF receiving circuit 7 and a microcomputer 8.

The temperature sensor 3 is a temperature state detector for detecting a temperature of the tire including the tire pressure sensor 2. The temperature sensor 3 generates a signal voltage corresponding to the detected temperature and supplies the signal voltage to the AD converter 5. The amplifier circuit 4 is a circuit for amplifying and outputting the signal voltage output from the tire pressure sensor 2. The amplifier circuit 4 receives the signal voltage output from the tire pressure sensor 2. The amplified voltage (analog signal) generated by the amplifier circuit 4 is supplied to the AD converter 5. The AD converter 5 is a circuit for converting the analog signal supplied from the amplifier circuit 4 into a digital signal. More specifically, the AD converter 5 receives the amplified voltage output from the amplifier circuit 4. The AD converter 5 performs an AD conversion on the amplified voltage to generate an AD converted value (digital data), and outputs the AD converted value to the microcomputer 8. Also, the AD converter 5 performs an AD conversion on the signal voltage output from the temperature sensor 3.

The RF transmission circuit 6 is a data transmission module for transmitting the data supplied through a bus 9. The RF transmission circuit 6 transmits the supplied data as the data signal to the body-side module 22 through the RF antenna 21a by using the RF radio waves. The LF receiving circuit 7 is a signal processor for processing the command signals supplied from the coil antenna 21b. The LF receiving circuit 7 supplies the received command signals to the microcomputer 8 through the bus 9.

The microcomputer (processor) 8 is an integrated circuit in the semiconductor device 1. Based on the digital signals output from the AD converter 5, the microcomputer 8 calculates tire pressure, tire temperature, variation of the tire pressure and so on. The microcomputer 8 generates pressure data indicative of the calculated tire pressure, temperature data indicative of the calculated tire temperature, variation data indicative of the calculated variation and the like. The microcomputer 8 outputs the generated data to the above-mentioned RF transmission circuit 6. The data including the variation data is output to the RF transmission circuit 6 and is transmitted to the body-side module 22 through the RF antenna 21a by using the RF radio waves. As shown in FIG. 6, the microcomputer 8 includes a memory 81 and a CPU 82. The memory 81 is a data writable/readable storage device. In the present embodiment, the memory 81 is a RAM (Random Access Memory), for example. It goes without saying that the memory 81 can be a non-volatile memory represented by an EEPROM (Electrically Erasable Programmable Read Only Memory). The CPU 82 is an arithmetic processing unit in the microcomputer 8. The CPU 82 controls the various devices contained in the semiconductor device 1 and processes various data received through the bus 9.

Figure 7:
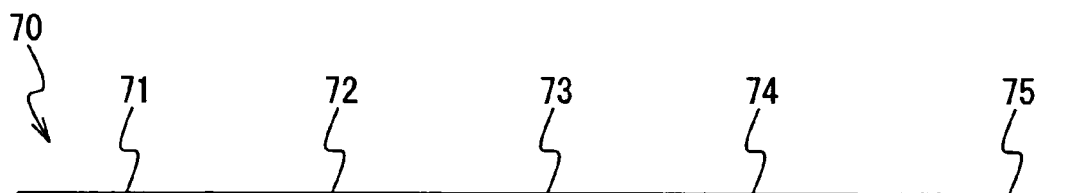
FIG. 7 shows a table stored in a memory according to the present embodiment.

The memory 81 stores a table. The table indicates a relationship between temperatures and initial tire pressure values. More specifically, the contents of the table are shown in FIG. 7. As shown in FIG. 7, the table 70 stores various temperature ranges 71 and sets of tire pressure information (72 to 75). Respective of the temperature ranges 71 are associated with respective of the sets of tire pressure information 72 to 75.

The temperature ranges 71 correspond to a plurality of ranges of the tire temperature detected by the temperature sensor 3. Each of the plurality of ranges has a predetermined size. As shown in FIG. 7, for example, the size of each range is 5 degrees centigrade. That is to say, the tire temperature is classified into the plurality of ranges every 5 degrees centigrade. The size of each range can be set arbitrarily. For example, in a case when the tire pressure sensor 2 has a large temperature dependence (ratio of variation of the sensor output to the temperature variation is large), the size of each range can be set smaller so that the variation of the tire pressure can be monitored with high reliability.

An initial value 72 is an initial tire pressure value and is used for calculating the variation of the tire pressure. A latest observed value 73 indicates the latest tire pressure value which is obtained by the tire pressure sensor 2. When the microcomputer 8 receives current pressure information (AD converted value) from the AD converter 5, the microcomputer 8 refers to the table 70 stored in the memory 81. At this time, if an initial value is not stored in the table 70 (for example, see a row indicated by the temperature range "5 to 10" in FIG. 7), the microcomputer 8 stores the current pressure information as the initial value 72 in the table 70. A variation value 74 indicates a difference between the initial value 72 and the latest observed value 73. When the tire pressure decreases or increases greatly from the initial value, the variation value 74 becomes large. An alert value 75 indicates a threshold value of the variation value 74 where an alert is necessary. When the variation value 74 exceeds the alert value 75, the microcomputer 8 outputs an alert signal. In this way, the initial values 72 associated with respective temperature ranges 71 are prepared in advance, and the variation value 74 is calculated by comparing the current pressure value and the initial value corresponding to current temperature. Therefore, even if the air inside the tire expands in response to the temperature increase, the variation of the tire pressure can be calculated without a complex correction. Since an expensive sensor of high-precision is not necessary, it is possible to reduce the cost of the TPMS.

Figure 8:
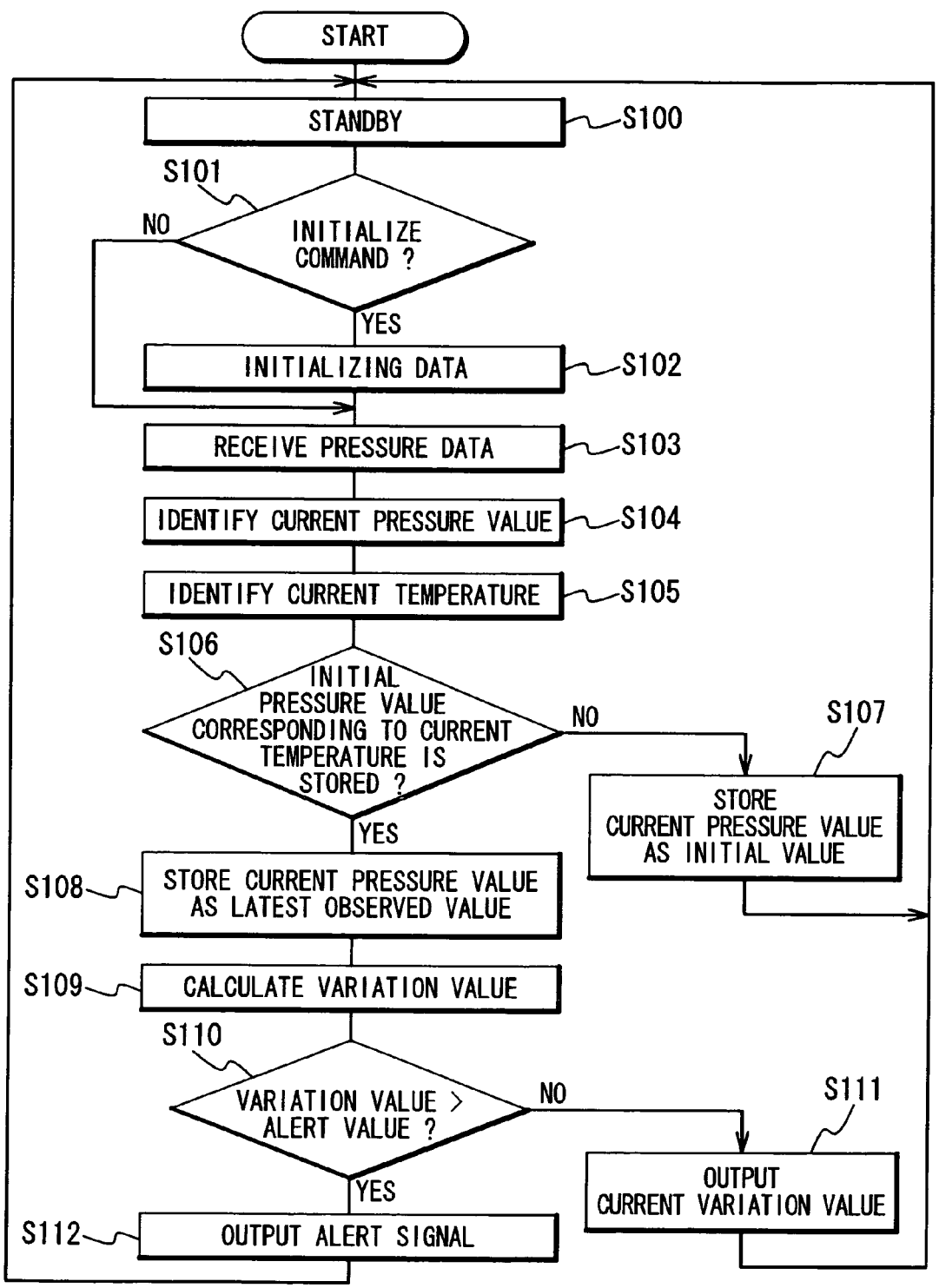
FIG. 8 is a flowchart showing an operation according to the present embodiment.

FIG. 8 is a flowchart showing an operation in the present embodiment. The operation shown in FIG. 8 starts when the tire pressure monitoring system of the vehicle is activated. When the system starts the operation, the tire-side module 15 enters the standby state and waits for the command data signals (the LF radio waves) transmitted from the sensor initiator 18. Usually, the tire pressure is determined according to the preference of a driver of the vehicle. By initializing the table 70 at a certain timing, the driver can set the initial tire pressure value to the tire pressure at the certain timing.

When the system starts the operation, the tire-side module 15 enters the standby state and waits for the command data signals (the LF radio waves) transmitted from the sensor initiator 18 (Step S100). When the tire-side module 15 receives the command data signals from the body-side module 22 through the sensor initiator 18, the operation proceeds to a Step S101.

At the Step S101, the semiconductor device 1 determines whether or not the tire-side module 15 has received an initialize command as the command signal through the coil antenna 21b. More specifically, the LF receiving circuit 7 supplies the received command signal to the microcomputer 8, and the microcomputer 8 carries out the determination. When the semiconductor device 1 receives the initialize command, the CPU 82 accesses the memory 81 and initializes the data (the initial values 72, the latest observed values 73, and the variation values 74) stored in the table 70 (Step S102). At least, the initial values 72 are deleted from the table 70. If the initialize command is not received, the operation proceeds to a Step S103.

At the step S103, the microcomputer 8 receives the pressure data (AD converted value) supplied from the AD converter 5. On the basis of the pressure data received at the Step S103, the microcomputer 8 identifies a current tire pressure value (Step S104). Also, the microcomputer 8 identifies a current tire temperature (current pressure sensor temperature) when receiving the pressure data (Step S105). On identifying the current tire temperature, the temperature sensor 3 is used. That is, the microcomputer 8 identifies the temperature of the pressure sensor 2 based on the output of the temperature sensor 3. After the completion of the temperature identification, the operation proceeds to a Step S106.

At the step S106, the microcomputer 8 specifies one temperature range 71 corresponding to the current temperature identified at the Step S105 with reference to the table 70. Then, the microcomputer 8 determines whether or not an initial value 72 corresponding to the specified temperature range 71 (current temperature) is already recorded on the table 70. If the initial value 72 corresponding to the specified temperature range 71 (current temperature) is not recorded on the table 70, the operation proceeds to a Step S107. At the Step S107, the microcomputer 8 adds the current pressure value as the corresponding initial value 72 to the table 70. Then, the operation returns back to the Step S100, and the tire-side module 15 enters a standby state.

If the initial value 72 corresponding to the specified temperature range 71 (current temperature) is already recorded on the table 70, the operation proceeds to a Step S108. At the Step S108, the microcomputer 8 stores the current pressure value as the latest observed value 73 corresponding to the specified temperature range 71. When the latest observed value 73 measured at a previous time is stored, the microcomputer 8 updates the latest observed value 73. Also, the microcomputer 8 reads out the initial value 72 corresponding to the specified temperature range 71 from the table 70. Thus, the initial value 72 corresponding to the current temperature is obtained. Then, the operation proceeds to a Step S109.

At the Step S109, the microcomputer 8 calculates a variation value 74 which indicates a difference between the obtained initial value 72 and the current pressure value. At a step S110, the microcomputer 8 compares the calculated variation value 74 with the alert value 75, and judges whether or not the calculated variation value 74 exceeds the alert value 75. If the calculated variation value 74 does not exceed the alert value 75, the current variation value 74 is output as a variation data. The variation data indicative of the current variation value 74 is transmitted to the body-side module 22 through the RF transmission circuit 6 (Step S111). The variation data is displayed on the display unit 24 (see FIGS. 3 and 4). Then, the operation returns back to the Step S100, and the tire-side module 15 enters a standby state.

If the calculated variation value 74 exceeds the alert value 75, the operation proceeds to a Step S112 and the microcomputer 8 outputs an alert signal. The alert signal is transmitted to the body-side module 22 through the RF transmission circuit 6. The alert unit 26 (see FIGS. 3 and 4) sends an alert to the driver. Then, the operation returns back to the Step S100, and the tire-side module 15 enters a standby state.

According to the present embodiment, as described above, it is possible to detect the variation of the tire pressure accurately, even if characteristics of the pressure sensor depend on temperature and the sensor output varies in accordance with the temperature variation. It is possible to properly compare the pressure data stored as the initial pressure value and the current pressure value. It is thus possible to reduce the error of the sensor output caused by the temperature variation. Also, in order to calculate the variation of the tire pressure precisely, it is necessary to consider that the air pressure inside the tire is changed in accordance with the temperature variation. According to the present embodiment, the initial pressure values associated with respective temperature ranges are prepared in advance, and the variation value is calculated by comparing the current pressure value and the initial pressure value corresponding to the current temperature. Therefore, even if the air inside the tire expands in response to the temperature increase, the variation of the tire pressure can be calculated without a complex correction. Furthermore, since an expensive sensor of high-precision is not necessary, it is possible to reduce the cost of the TPMS.

It is apparent that the present invention is not limited to the above embodiment, and that may be modified and changed without departing from the scope and spirit of the invention.

What is claimed is:

1. A variation detection device comprising:
a processor;
an AD converter converting a signal voltage output from a sensor to generate an AD converted value and outputting said AD converted value to said processor;
a temperature sensor detecting a temperature of said sensor; and
a memory storing a table which indicates a relationship between temperatures and initial values,
wherein when receiving said AD converted value, said processor identifies a temperature of said sensor based on an output of said temperature sensor, reads out an initial value corresponding to said identified temperature from said table stored in said memory, and calculates a variation between said initial value and said AD converted value, and
wherein said variation is calculated by subtracting the AD converted value from an initial AD converted value that was measured at a temperature at which the present AD converted value is measured.

2. The variation detection device according to claim 1, wherein when said initial value corresponding to said identified temperature is not recorded on said table, said processor adds said AD converted value as said corresponding initial value to said table.

3. The variation detection device according to claim 1, wherein said table further indicates a threshold value, and said processor outputs an alert signal when said calculated variation exceeds said threshold value.

4. The variation detection device according to claim 2, wherein said table farther indicates a threshold value, and said processor outputs an alert signal when said calculated variation exceeds said threshold value.

5. The variation detection device according to claim 1, wherein said processor deletes said initial values from said table in response to an initialize command.

6. A data communication apparatus comprising:
a processor;
a pressure sensor;
an AD converter converting a signal voltage output from said pressure sensor to generate an AD converted value and outputting said AD converted value to said processor;
a temperature sensor detecting a temperature of said pressure sensor;
a memory storing a table which indicates a relationship between temperatures and initial pressure values;
a receiving circuit supplying a received command signal to said processor; and
a transmission circuit,
wherein when receiving said AD converted value, said processor identifies a temperature of said pressure sensor based on an output of said temperature sensor, reads out an initial pressure value cow-responding to said identified temperature from said table stored in said memory, calculates a variation between said initial pressure value and said AD converted value, and outputs a variation data indicative of said calculated variation through said transmission circuit, and
wherein said variation is calculated by subtracting the AD converted value from an initial AD converted value that was measured at a temperature at which the present AD converted value is measured.

7. The data communication apparatus according to claim 6, wherein when said initial pressure value corresponding to said identified temperature is not recorded on said table, said processor adds said AD converted value as said corresponding initial pressure value to said table.

8. The data communication apparatus according to claim 6, wherein said table further indicates a threshold value, and said processor compares said calculated variation with said threshold value and outputs an alert signal through said transmission circuit when said calculated variation exceeds said threshold value.

9. The data communication apparatus according to claim 7, wherein said table further indicates a threshold value, and said processor compares said calculated variation with said threshold value arid outputs an alert signal through said transmission circuit when said calculated variation exceeds said threshold value.

10. The data communication apparatus according to claim 6,
wherein said processor deletes said initial pressure values from said table in response to said received command signal.

11. A vehicle comprising:
a data transmission apparatus; and
a data receiving apparatus configured to receive a variation data transmitted from said data transmission apparatus,
wherein said data transmission apparatus includes:
a processor;
a pressure sensor measuring a tire pressure of said vehicle;
an AD converter converting a signal voltage output from said pressure sensor to generate an AD converted value and outputting said AD converted value to said processor;
a temperature sensor detecting a temperature of said pressure sensor;
a memory storing a table which indicates a relationship between temperatures and initial tire pressure values;
a receiving circuit supplying a received command signal to said processor; and
a transmission circuit,
wherein when receiving said AD converted value, said processor identifies a temperature of said pressure sensor based on an output of said temperature sensor, reads out an initial tire pressure value corresponding to said identified temperature from said table stored in said memory, calculates a variation between said initial tire pressure value and said AD converted value, and outputs said variation data indicative of said calculated variation through said transmission circuit to said data receiving apparatus, and
wherein said variation is calculated by subtracting the ND converted value from an initial AD converted value that was measured at a temperature at which the present AD converted value is measured.

12. The vehicle according to claim 11, wherein said data transmission apparatus is installed in a tire of said vehicle, and said data receiving apparatus is installed in a body of said vehicle.

13. The vehicle according to claim 11, wherein when said initial tire pressure value corresponding to said identified temperature is not recorded on said table, said processor adds said AD converted value as Said corresponding initial tire pressure value to said table.

14. The vehicle according to claim 11, wherein said table further indicates a threshold value, and said processor compares said calculated variation with said threshold value and outputs an alert signal through said transmission circuit to said data receiving apparatus when Said calculated variation exceeds said threshold value.

15. The vehicle according to claim 11,
wherein said processor deletes said initial tire pressure values from said table in response to said received command signal.

16. A method of detecting a variation of tire pressure comprising:
providing a memory which stores a table which indicates a relationship between temperatures and initial tire pressure values;
providing a pressure sensor configured to measure said tire pressure;
AD converting a signal voltage output from said pressure sensor to generate an AD converted value;
identifying a temperature of said pressure sensor in response to said AD converted value;
obtaining an initial tire pressure value corresponding to said identified temperature from said table stored in said memory; and
calculating a variation between said initial tire pressure value and said AD convened value,
wherein said variation is calculated 1w subtracting the AD converted value from an initial AD converted value that was measured at a temperature at which the present AD converted value is measured.

17. The method according to claim 16, further comprising:
adding said AD converted value as said initial tire pressure value corresponding to said identified temperature to said table, when said corresponding initial tire pressure value is not recorded on said table.

18. The method according to claim 16, further comprising:
alerting when said calculated variation exceeds a threshold value.

19. The method according to claim 17, further comprising:
alerting when said calculated variation exceeds a threshold value.

20. The method according to claim 16, further comprising:
deleting said initial tire pressure values from said table in response to an initialize command.

* * * * *